United States Patent [19]

Herr

[11] 4,453,196
[45] Jun. 5, 1984

[54] APPARATUS FOR TRANSMITTING ELECTRIC CURRENT BY CONCENTRIC CHANNELS OF IONIZED GAS

[76] Inventor: Jan E. Herr, 6250½ Stanley Ave., San Diego, Calif. 92115

[21] Appl. No.: 488,191

[22] Filed: Apr. 25, 1983

Related U.S. Application Data

[63] Continuation of Ser. No. 404,062, Aug. 2, 1982, abandoned, which is a continuation-in-part of Ser. No. 233,515, Feb. 11, 1981, abandoned.

[51] Int. Cl.³ .............................................. F41F 5/00
[52] U.S. Cl. ..................................... 361/232; 89/1 A
[58] Field of Search ......................... 361/232; 89/1 A; 372/103, 87, 88, 94; 430/945; 362/259; 356/310, 350; 350/124

[56] References Cited

U.S. PATENT DOCUMENTS

| 3,719,829 | 3/1973 | Vaill | 361/232 |
| 3,971,292 | 7/1976 | Paniagua | 361/232 X |
| 4,253,132 | 2/1981 | Cover | 361/232 |

Primary Examiner—Reinhard J. Eisenzopf
Attorney, Agent, or Firm—Charmasson & Holz

[57] ABSTRACT

An apparatus for transmitting electrical current to a distal target via two concentric channels of electrically conductive gas. The conductive channels are created by multi-photon and collisional ionization along the paths of two concentric laser beams directed to the target. A pulsed high-voltage field traversed by the beams causes a current to flow along the channels of free electrons within the beams. The concentric channels are created by interposing a ring-shaped reflecting shield across a single laser beam. The pulsed high-voltage field is applied to two concentric electrodes made of conductive glass placed in the path of the concentric beams.

4 Claims, 4 Drawing Figures

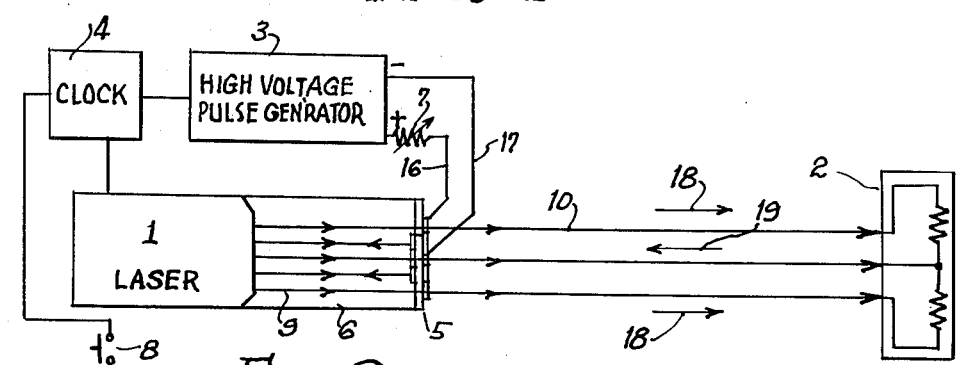
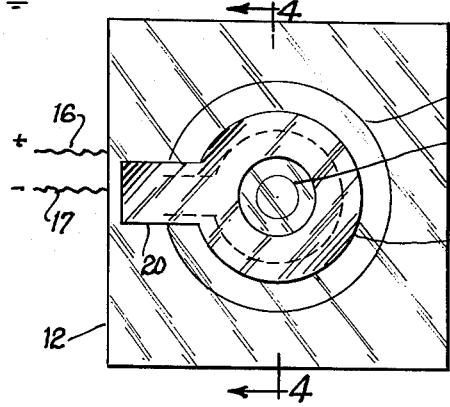 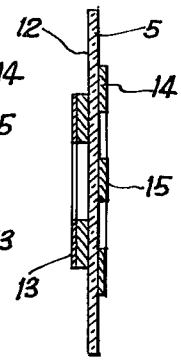
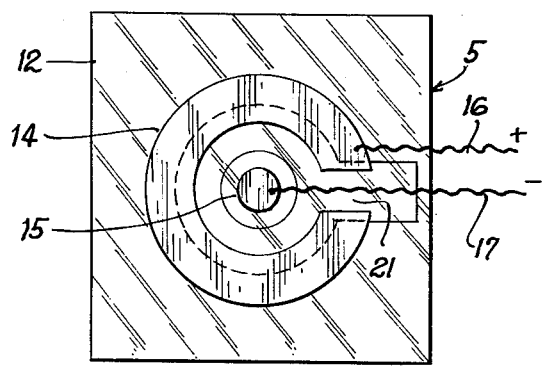

APPARATUS FOR TRANSMITTING ELECTRIC CURRENT BY CONCENTRIC CHANNELS OF IONIZED GAS

PRIOR APPLICATIONS

This is a continuation of my co-pending application, Ser. No. 404,062 filed Aug. 2, 1982 abandoned, which is a continuation-in-part of Ser. No. 233,515 filed Feb. 11, 1981 and now abandoned.

FIELD OF THE INVENTION

This invention relates to laser technology and more particularly to the creation of a conductive electrical circuit within a gas.

PRIOR ART

The instant invention relates from prior experiences in laser induced ionization described by Koopman and Wilkerson, "Channeling of Ionizing Electrical Streamer by a Laser Beam," *Journal of Applied Physics*, Vol. 42, No. 5, April 1971, pp. 1183-1186 and Koopman and Saum, "Formation and Guiding of High-Velocity Electrical Streamers by Laser Induced Ionization," *Journal of Applied Physics*, Vol. 44, 1973, pp. 5328-5336. A prior application of laser induced ionization can be found in U.S. Pat. No. 3,775,638, Tidman, and U.S. Pat. No. 4,017,767 issued to Leonard M. Ball on Apr. 12, 1977, which disclosed a method for establishing an ionized conductive path for discharging thunderclouds by means of a laser beam.

BACKGROUND OF THE INVENTION

Efficient wireless transmission of electrical energy through the air is a long-sought goal of physicists. Various degrees of success have been achieved in the directional transmission of radiated energy. However, the energy consumed in the transformation of electrical current to electromagnetic waves and other forms of radiations, and losses through peripheral dispersion of the radiated energy between transmitting and receiving stations render the process impractical.

A highly directional transmission of electrical energy to a distal target along a narrow path of ambient air could have many scientific and industrial applications.

SUMMARY OF THE INVENTION

The principal object of the instant invention is to provide an efficient and compact means by which an electrical circuit may be established in a gaseous medium.

Another object of this invention is to provide a highly directional means to transmit electrical energy to a distal target without using solid conductors.

A further object of the invention is to provide a means for creating concentric conductive paths in a gaseous medium.

These and other useful objects are achieved by splitting a laser beam into two concentric isolated columns in each of which a current-carrying electrode is exposed, as more completely explained in the following description of the preferred embodiment.

BRIEF DESCRIPTION OF THE DRAWINGS

FIG. 1 is a diagrammatical illustration of the invention;

FIG. 2 is a front elevational view of the beam-shaping objective installed at the output of the laser;

FIG. 3 is a back elevational view thereof; and

FIG. 4 is a cross-sectional view thereof taken across line 4—4 of FIG. 2.

DETAILED DESCRIPTION OF THE PREFERRED EMBODIMENT

Referring now to the drawing and more specifically to FIG. 1, there is illustrated the preferred embodiment of the invention. A laser 1, preferably used in the pulsed mode, directs a photon beam 9 toward a distal load or target 2. Outside the laser 1, channels of ionized gas, such as air, 10 and 11 are created by the photon beam 9 according to the multi-photon ionization and collisional ionization processes. At the output of the laser 1 is mounted a beam-shaping objective 5 made of transparent glass. A reflecting mirror 13 in the shape of a ring reflects a circular portion of the laser beam 9. Thus, outside the objective, the laser-ionized channels appear as two concentric elements 10 and 11 separated by a gap caused by the reflecting mirror 13. A high-voltage pulse generator 3 has one of its output terminals connected by conductor 16 to a transparent but electrically conductive electrode 14 in the form of an open ring located on the outer face of the objective 5 in the path of the outer channel 10.

The opposite terminal of the high-voltage pulse generator 3 is connected by means of conductor 17 to a second electrode 15 located concentrically to electrode 14 on the outer face of objective. Electrode 15 is also transparent but electrically conductive and lies in the path of the central channel 11. A variable resistor 7 is mounted in series with one of the terminals of the high-voltage pulsed generator and can be controlled by a feedback mechanism in order to maintain the desired current through the target. A clocking system 4 generates synchronizing signals for both the pulsed laser 1 and the high voltage pulse generator 3. The clock itself can be manually triggered.

Assuming that a sufficient number of free electrons are created by the multi-photon, collisional, and other ionization processes between the electrode 14 and the target 2, an electrical path 18 for the high-voltage pulses issuing from the generator 3 is provided to the distal load or target 2.

The return path 19 for the high-voltage pulses is provided by the central portion of the laser beam 9 which passes through electrode 15.

The objective 5 acts as an electrical barrier to the high-voltage pulses which cannot travel toward the laser unit 1.

A small gap in the outer ionized channel 10 created by the projection 20 on mirror 13 and the break 21 in electrode 14 allows for the deflection of the beams by way of mirrors if necessary along their path, without shorting the two concentric electrical channels, provided that the angle of deflection lies in the same plane as the median line of the gap.

The most efficient laser available for the present application in air is an Argon Fluoride discharge-pumped excimer laser with a wavelength of 193 nanometers.

A reasonable power density and pulse repetition rate for this laser is five megawatts per square centimeter and 200 pulses per second, respectively.

Because of its atmospheric density, ionization threshold, and number of photons required for ionization, molecular oxygen will clearly produce the necessary preionization electron density in air at this wavelength.

At 193 nanometers, molecular oxygen has a two-photon ionization cross section $1 \times 10^{-34}$ cm$^4$/watt.

Molecular nitrogen, which constitutes the bulk of air, produces an insignificant degree of ionization at this wavelength and power density.

Several other atmospheric molecules will undergo two-photon ionization at this wavelength. However, because of their small proportions in air, none can produce the needed electron density.

The electron density during each pulse depends upon the balance between the electron production rate and the electron loss rate.

The electron production rate is calculated from the photoionization cross section.

For a laser with a one square centimeter aperture, a pulse duration of 10 nanoseconds, and an output energy of 10 millijoules, the power density will be one megawatt per square centimeter.

The electron production rate will be $6.3 \times 10^{14}$ per cubic centimeter per second in the air immediately outside the aperture.

During each pulse, $6.3 \times 10^6$ electrons per cubic centimeter will be created.

Because the preionization electron density must be between $10^6$ and $10^8$ per cubic centimeter, the above value is probably sufficient to conduct a current of several milliamperes.

However, $1.6 \times 10^8$ electrons per cubic centimeter will be produced during each pulse if the output energy is increased to 50 millijoules.

In both two-body and three-body electron attachment processes, the delay time between the termination of the laser pulse and the onset of the high-voltage pulse will determine how many electrons are available for preionization.

In the worst case, which occurs when the electron energy is about 0.1 electron volt, the three-body attachment becomes rapid, and the steady state electron density for a 193 nanometer, five megawatt per square centimeter beam is reduced to $8 \times 10^7$ per cubic centimeter.

The absorption of the laser beam by the atmosphere will determine the approximate range of the instant invention.

The Schumann-Runge bands and the underlying continuum in molecular oxygen constitute the major absorption factors at 193 nanometers.

The electron production rate varies as the square of the laser flux, which is attenuated in dry air at this wavelength about $1 \times 10^{-4}$ per centimeter.

At this wavelength, the laser beam will propagate approximately 100 meters before its intensity is decreased to $\frac{1}{3}$ of its initial value.

The electron density at the aperture of a 193 nanometer, five megawatt per square centimeter laser is $1.6 \times 10^8$ per cubic centimeter. After 100 meters, the electron density is $2.2 \times 10^7$ per cubic centimeter.

The range of transmission may be significantly increased when more efficient lasers become available.

Various techniques including those suggested in U.S. Pat. No. 4,017,767 which is incorporated herein by reference, may be used in order to enhance the multiphoton ionization as well as the collisional ionization along the laser beams. These techniques are well-known to persons skilled in the electrical arts.

A current of 3 milliamperes can be carried by a gaseous channel with a concentration of $10^8$ ions per cubic centimeter. This concentration can be most efficiently achieved in air by ionizing oxygen with ultraviolet radiation of 193 nanometers. Although the use of lasers has been suggested, it should be understood that any equivalent means which would generate a highly concentrated beam of ionizing radiation could be used in their steads.

While I have described the preferred embodiment of the invention, other embodiments may be devised without departing from the spirit of the invention and the scope of the appended claims.

What is claimed is:

1. An apparatus for applying an electrical current to a distant target via channels of conductive gas which comprises:
   means for generating laser beams of sufficient energy to ionize a column of ambient gas between the apparatus and the target;
   a voltage generator;
   a reflecting mirror having an aperture therethrough interposed in the path of said column, the incident profile which the mirror exposes to the laser beam being lesser than the cross-sectional area of the beam;
   a first electrode connected to one pole of the voltage generator, said electrode being ring-shaped and placed in the path of that outer portion of the beam which extends beyond the outer periphery of the mirror; and
   a second electrode connected to the other pole of the voltage generator and located in the path of that inner portion of the beam which passes through the aperture of the mirror.

2. The apparatus claimed in claim 1 wherein said reflecting mirror has an outer perimeter which is smaller than the perimeter of a cross section of the beam.

3. The apparatus claimed in claim 2 which further comprises a nonconductive transparent objective mounted in the path of said beam, said objective carrying on its laser-facing side of the reflecting mirror and on its opposite side the electrodes.

4. The apparatus claimed in claim 3 wherein the reflection mirror comprises a narrow lateral projection shaped to create a gap in the outer portion of the beam.

* * * * *